(12) United States Patent
Verdeyen et al.

(10) Patent No.: US 7,804,877 B2
(45) Date of Patent: Sep. 28, 2010

(54) ATOMIC LASERS WITH EXCIPLEX ASSISTED ABSORPTION

(75) Inventors: Joseph T. Verdeyen, Savoy, IL (US);
James Gary Eden, Champaign, IL (US);
David L. Carroll, Urbana, IL (US);
Jason D. Readle, Champaign, IL (US);
Clark J. Wagner, Champaign, IL (US)

(73) Assignees: CU Aerospace, LLC, Champaign, IL (US); The Board of the University of Illinois, Urbana, IL (US)

( * ) Notice: Subject to any disclaimer, the term of this patent is extended or adjusted under 35 U.S.C. 154(b) by 58 days.

(21) Appl. No.: 12/122,874

(22) Filed: May 19, 2008

(65) Prior Publication Data

US 2008/0285614 A1 Nov. 20, 2008

Related U.S. Application Data

(60) Provisional application No. 60/938,797, filed on May 18, 2007.

(51) Int. Cl.
*H01S 3/22* (2006.01)
(52) U.S. Cl. .......................................... 372/56; 372/57
(58) Field of Classification Search .............. 372/56–57
See application file for complete search history.

(56) References Cited

U.S. PATENT DOCUMENTS 4,229,711 A * 10/1980 Schimitschek et al. ........ 372/56
6,643,311 B2 11/2003 Krupke 2003/0099272 A1 * 5/2003 Krupke ......................... 372/75
2004/0228383 A1 * 11/2004 Krupke ......................... 372/75

OTHER PUBLICATIONS

William F. Krupke, Raymond J. Beach, V. Keith Kanz and Stephen A. Payne, "Resonance transition 795-nm rubidium laser," Optics Letters, Dec. 1, 2003, pp. 2336-2338, vol. 28, No. 23.
William F. Krupke, Raymond J. Beach, V. Keith Kanz and Stephen A. Payne, "DPAL: A new class of CW, near-infrared, high-power diode-pumped alkali (vapor) lasers," Proc. of SPIE, 2004, pp. 156-167, vol. 5334.
Raymond J. Beach, William F. Krupke, V. Keith Kanz and Stephen A. Payne, "End-pumped continuous-wave alkali vapor lasers: experiment, model, and power scaling," Optical Society of America, Dec. 2004, pp. 2151-2163, vol. 21, No. 12.

(Continued)

*Primary Examiner*—Tod T Van Roy
(74) *Attorney, Agent, or Firm*—Adam K. Sacharoff; Much Shelist

(57) ABSTRACT

The present invention provides in one of the embodiments for either a continuous wave (cw) or pulsed alkali laser having an optical cavity resonant at a wavelength defined by an atomic transition, a van der Waals complex within the optical cavity, the van der Waals complex is formed from an alkali vapor joined with a polarizable gas, and a pump laser for optically pumping the van der Waals complex outside of the Lorentzian spectral wings wherein the van der Waals complex is excited to form an exciplex that dissociates forming an excited alkali vapor, generating laser emission output at the wavelength of the lasing transition.

12 Claims, 9 Drawing Sheets

OTHER PUBLICATIONS

R. E. M. Hedges, D. L. Drummond and Alan Gallagher, "Extreme-Wing Line Broadening and Cs-Inert-Gas Potentials," Physical Review A, Oct. 1972, pp. 1519-1544, vol. 6, No. 4.

C. L. Chen and A. V. Phelps, "Absorption Coefficients for the Wings of the First Two Resonance Doublets of Cesium Broadened by Argon," Physical Review A, Feb. 1973, pp. 470-479, vol. 7, No. 2.

J. Pascale and J. Vandeplanque, "Excited molecular terms of the alkali-rare gas atom pairs," The Journal of Chemical Physics, Mar. 1974, pp. 2278-2289, vol. 60, No. 6.

S.N. Atamas, L.M. Bukshpun, Yu. V. Koptev, E.L. Latush and M.F. Sem, "Stimulated emission of the 535 nm thallium line as a result of quasiresonant optical pumping of a UI-He mixture by radiation from a recombination of He-Ca laser," Sov. J. Quantum Electron., Feb. 1984, pp. 161-162, American Institute of Physics.

Santaram Chilukuri, "Selective optical excitation and inversions via the excimer channel: Superradiance at the tallium green line," Appl. Phys. Lett, Feb. 15, 1978, pp. 284-286, American Institute of Physics.

D. E. Gilbert and S. Y. Ch'en, "Pressure Effects of Foreign Gases on the Absorption Lines of Cesium VI. Intensity Measurements of the Cesium Resonance Lines and Their Associated Satellites in the Presence of Various Foreign Gases," Phys. Rev., Dec. 5, 1969, pp. 40-45, vol. 188.

J. Cooper, "Comments of the Theory of Satellite Bands," Joint Institute for Laboratory Astrophysics, Nov. 18, 1978, JILA Report #111.

* cited by examiner

ATOMIC LASERS WITH EXCIPLEX ASSISTED ABSORPTION

FIELD OF THE INVENTION

The present invention relates to high power gas lasers lasing on atomic transitions such as the first and second principal series of the alkali atoms.

BACKGROUND OF THE INVENTION

Approximately four years ago, a group at the Lawrence Livermore National Laboratory (LLNL), led by William F. Krupke, demonstrated [1-4] an optically-pumped atomic Cs laser operating on the resonance line at 894.6 nm (in vacuum, 894.3 nm in air). This transition had lased previously but Krupke et al.'s results were novel in that they optically pumped the 6p $^2P_{3/2}$ state by exciting the 6s $^2S_{1/2}$→6p $^2P_{3/2}$ ($D_2$) transition at λ~852.3 nm (in vacuum, 852.1 nm in air), as shown in FIG. 1, and relaxed the $^2P_{3/2}$ state to the lower-lying 6p $^2P_{1/2}$ level in order to obtain lasing on the $^2P_{1/2}$→$^2S_{1/2}$ (ground) transition at 894.6 nm ($D_1$ transition, FIG. 1). This scheme for the Cs laser is also illustrated in FIG. 2.

Recently, this pumping scheme has produced more than 10 W of output power at 894 nm and the level of interest in the laser community is rising rapidly because it appears that this laser may offer a route to extremely high power levels. The primary reason for the interest is that it allows one to use high power semiconductor laser diodes as the pump source to drive a gas laser.

Gas lasers are ideal for high power lasers because the index of refraction of the gain medium is small and, hence, obtaining high quality (near diffraction-limited) output beams is generally straightforward. Furthermore, the aperture (transverse dimension) of gas lasers can be scaled readily, an essential feature if high power operation is to be obtained.

All of this is quite attractive but Krupke's pumping schemes have significant drawbacks. Since the atomic transition that is being pumped is spectrally very narrow (≈10 GHz, or equivalently≈0.02 nm), only a small portion of the semiconductor laser power will be absorbed by the alkali vapor because common semiconductor lasers typically emit with spectral widths of >1000 GHz (roughly 2 nm). To surmount this difficulty, Krupke proposed adding He gas (or other gases) to broaden the linewidth of the transition [1-4]. Unfortunately, to do this with He (which has a pressure broadening coefficient of approximately 20 GHz/atm at a wavelength of 800 nm), one must add up to 25-50 atmospheres (19,000-38,000 Torr) of gas if the pump transition linewidth is to match the spectral breadth of the semiconductor laser. In addition, Krupke was forced to use axial pumping in which the small wing absorption is multiplied by the longer axial length to enhance the pump utilization. However, such a pumping scheme has an inherent non-uniform pumping rate and, consequently, a spatially non-uniform population inversion that adversely affects beam quality and the ability to effectively scale in power. The alternative is to narrow the linewidth of the pump laser. This dramatically increases the cost and, more importantly, reduces the electrical-to-optical conversion efficiency because narrow linewidth diode lasers are inherently less electrically efficient than their broader linewidth counterparts. Furthermore, even if one overcomes the reduction in conversion efficiency of the semiconductor pump laser, it is generally necessary to stabilize the wavelength of the pump laser against drift. That is, because the pumping transition and semiconductor laser linewidth are both extremely narrow, "locking" the laser onto the absorption line is usually required. This restriction involves both optical and electronic hardware and results in more electrical efficiency losses.

SUMMARY OF THE INVENTION

One or more embodiments of the present invention relate to high power gas lasers lasing on atomic transitions such as the first and second principal series of the alkali atoms. By adding a polarizable rare gas (such as neon, argon, krypton, or xenon, or another atom such as Hg) to the alkali vapor, semiconductor lasers are able to pump (photoexcite) alkali-rare gas molecules which subsequently (and quickly) dissociate in such a way as to populate the upper level for an atomic laser. The advantages over prior art are: 1) high power, broad linewidth laser diodes can be used without the need for line-narrowing, 2) moderate gas pressures (not multi-atmospheres) can be used, 3) the laser need not be pumped axially but radially or transversely to the alkali laser resonator which is much more favorable for a high power laser system, and 4) lasing may be obtained on at least two transitions of an alkali atom without the need to collisionally relax the population of one state into another.

The embodiments presented herein make high power, continuous-wave (CW) alkali atomic lasers practical in the near-infrared wavelength regime, and with frequency-doubling, yield high power systems in the violet and near-ultraviolet.

In one of the embodiments, there is provided an alkali laser having an optical cavity resonant at a wavelength to define a lasing transition, a van der Waals complex within the optical cavity, and wherein the van der Waals complex is formed from an alkali vapor joined with a polarizable gas. The laser includes a pump laser for optically pumping the van der Waals complex outside of the Lorentzian spectral wings such that the van der Waals complex is excited to form an exciplex that dissociates forming an excited alkali vapor, generating laser emission output at the wavelength of the atomic lasing transition.

Different wavelengths of the pump laser can be used to control the state to which the van der Waals complex is pumped. In one embodiment, the wavelength of the pump laser is set to optically pump the van der Waals complex to either an $A^2\Pi_{3/2}$ or $B^2\Sigma^+_{1/2}$ state, both of which dissociate to the excited atomic alkali $^2P_{3/2}$ state and stimulated emission (lasing) at a wavelength known as the $D_2$ transition returns the atom to the ground state of $^2S_{1/2}$. In another embodiment, the wavelength of the pump laser is set to optically pump the van der Waals complex to an $A^2\Pi_{1/2}$ state which dissociates to the excited alkali vapor in the $^2P_{1/2}$ state and stimulated emission (lasing) at a wavelength known as the $D_1$ transition returns the atom to the ground state $^2S_{1/2}$. In yet another embodiment, the wavelength of the pump laser is set to optically pump the van der Waals complex to either an $A^2\Pi_{3/2}$ or $B^2\Sigma^+_{1/2}$ state and the optical cavity further includes a buffer gas to relax the excited alkali vapor from the $^2P_{3/2}$ state to the $^2P_{1/2}$ state and stimulated emission (lasing) at a wavelength known as the $D_1$ transition returns the excited alkali vapor from the $^2P_{1/2}$ state to the ground state $^2S_{1/2}$.

In various embodiments, the pump laser may be applied axially with the atomic laser or transverse to it and the alkali vapor may be static or be part of a flow loop.

Other embodiments provided herein may include a method for lasing including the step of pumping, with a pump laser, a van der Waals complex, outside of the Lorentzian spectral wings, wherein the van der Waals complex is formed from an alkali vapor joined with a polarizable gas such that during pumping of the van der Waals complex, the van der Waals complex excites to form an exciplex that dissociates forming an excited alkali vapor, and generating laser emission output from an optical cavity at a wavelength defined by the atomic lasing transition.

Numerous other advantages and features of the invention will become readily apparent from the following detailed description of the invention and the embodiments thereof, from the claims, and from the accompanying drawings.

BRIEF DESCRIPTION OF THE DRAWINGS

A fuller understanding of the foregoing may be had by reference to the accompanying drawings, wherein.

DETAILED DESCRIPTION OF THE EMBODIMENTS

Figure 1:
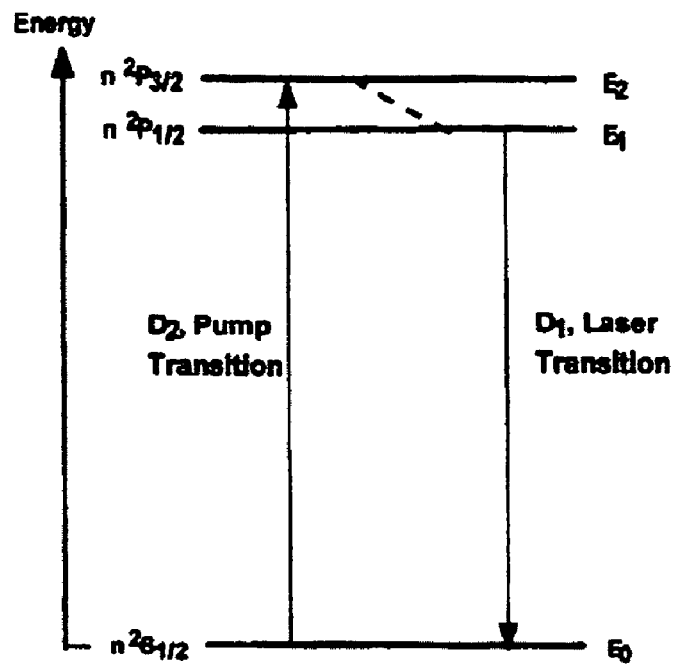
FIG. 1 is a prior art graph showing the ground and first two excited electronic energy levels of an alkali atom.
Figure 2:
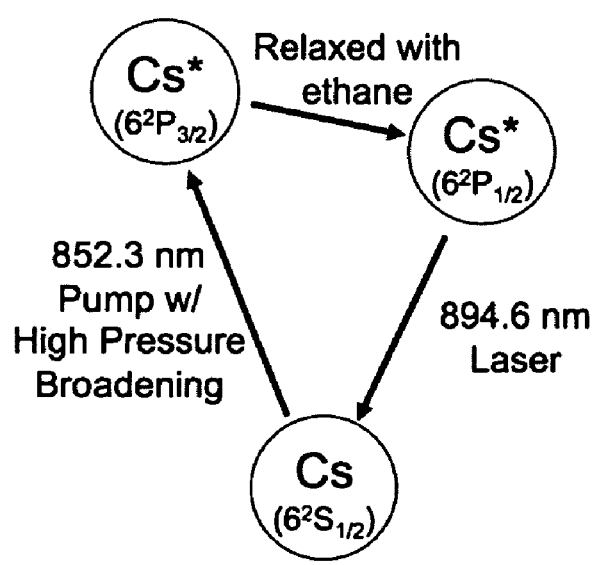
FIG. 2 is a prior art pictorial representation of FIG. 1.

While the invention is susceptible to embodiments in many different forms, there are shown in the drawings and will be described herein, in detail, the preferred embodiments of the present invention. It should be understood, however, that the present disclosure is to be considered an exemplification of the principles of the invention and is not intended to limit the spirit or scope of the invention and/or embodiments illustrated.

As provided in one or more of the embodiments presented herein, to address some of the issues described above, a molecular interaction is invoked to pump away from the atomic resonance but still obtain efficient lasing from the atom itself. Consider, for example, the CsAr molecule. It has been known for three decades [4, 5] that the interaction of Cs and Ar atoms forms molecules, known as excimers or exciplexes, that are stable only in an excited state, aside from a weak van der Waals interaction in the ground state, which is unstable (i.e., weakly bound or dissociative). For example, at cell temperatures of around 200° C., approximately 1% of the ground state population of Cs will be in the weakly bound CsAr van der Waals complex. The result is that mixtures of Cs vapors and Ar gas exhibit strong absorption on the order of tens of Å (or several nm) away from the atomic resonance.

Figure 3:
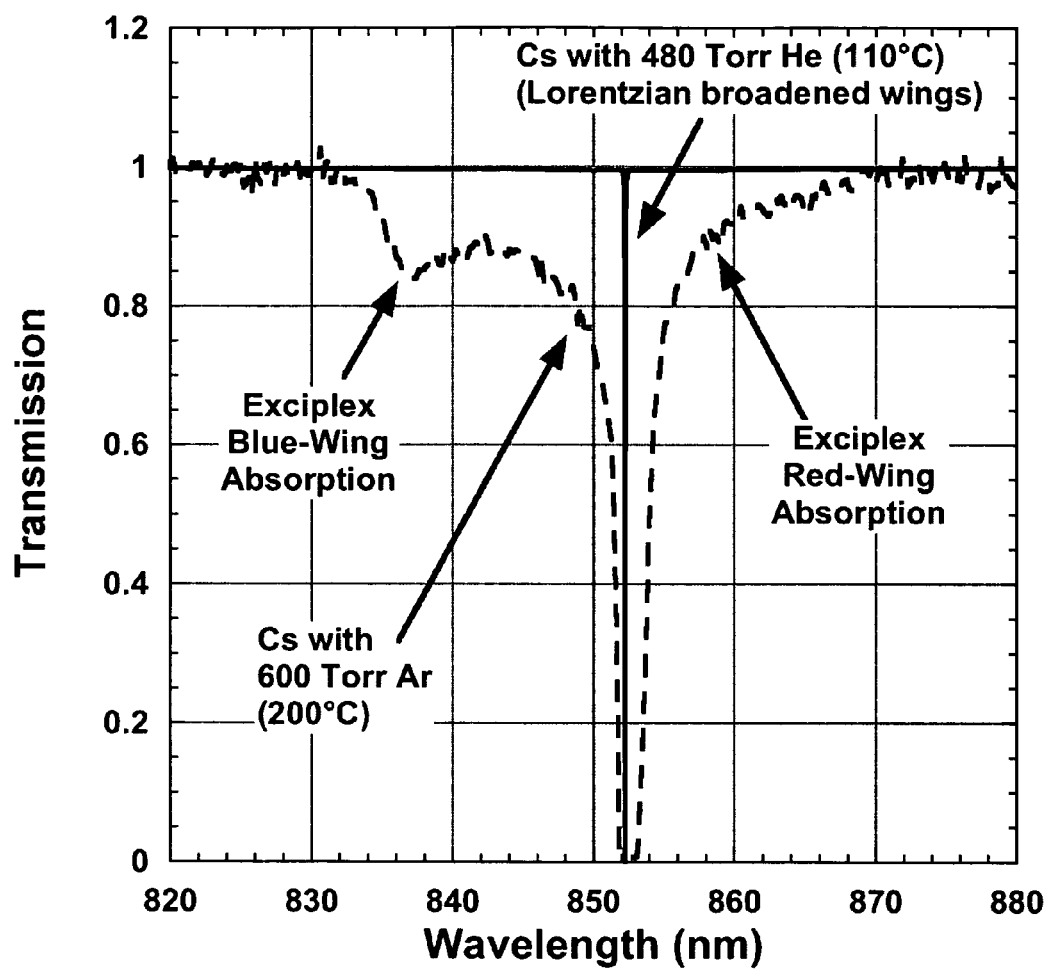
FIG. 3 is a diagram illustrating the differences in transmission through an alkali containing gas cell from the prior art to one or more embodiments in accordance with the present invention; for Cs+480 Torr of helium, absorption (loss of transmission) occurs only in the near vicinity of 852.3 nm, the $D_2$ transition and there is a much broader band of absorption with Cs+600 Torr of argon.

Referring now to FIG. 3 there is shown the differences in transmission (or equivalently absorption) for a Cs cell filled with 480 Torr of He at 110° C. that relies on Lorentzian broadening (≈0.03 nm in width) to absorb the pump radiation versus a Cs cell filled with 600 Torr of Ar at 200° C. which has a considerably broader absorption spectrum due to the blue and red wings from the exciplex. It is clear from FIG. 3 that the cell relying only on Lorentzian absorption will have a difficult time absorbing the pump radiation from a high-efficiency, broadband (≈2 nm) diode laser source, whereas absorbing the pump radiation in the exciplex wings can be easily accommodated.

Figure 4:
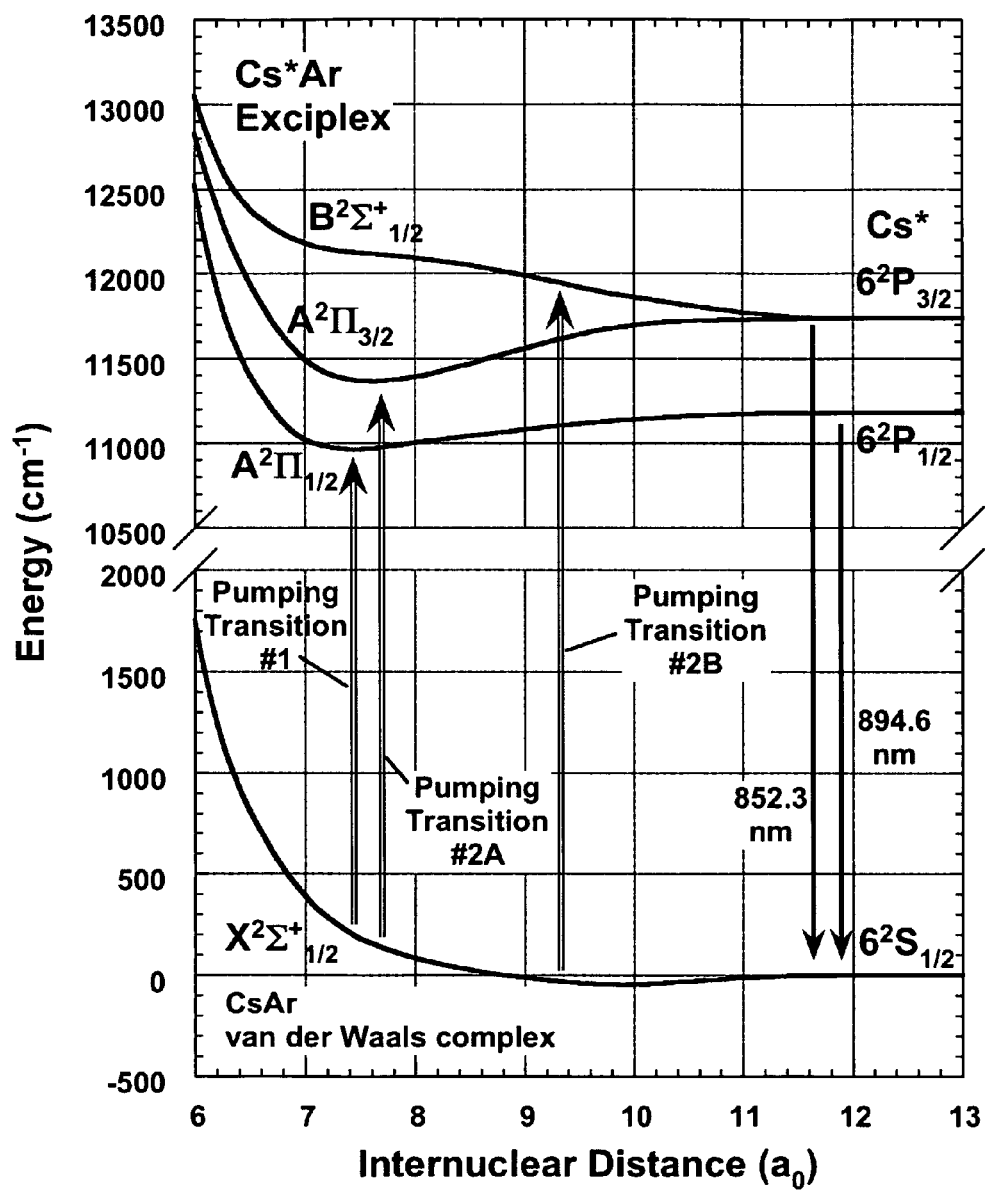
FIG. 4 is a partial energy level diagram for the Cs—Ar molecule.

Referring now to FIG. 4, there is shown a partial energy level diagram for the Cs—Ar molecule. The energy level diagram for the CsAr exciplex and the asymptotic states of atomic Cs are shown on the right side of the figure. The association of colliding pairs of Cs—Ar atoms to form CsAr van der Waals complexes is also illustrated. FIG. 4 can be generalized in FIG. 5.

Figure 5:
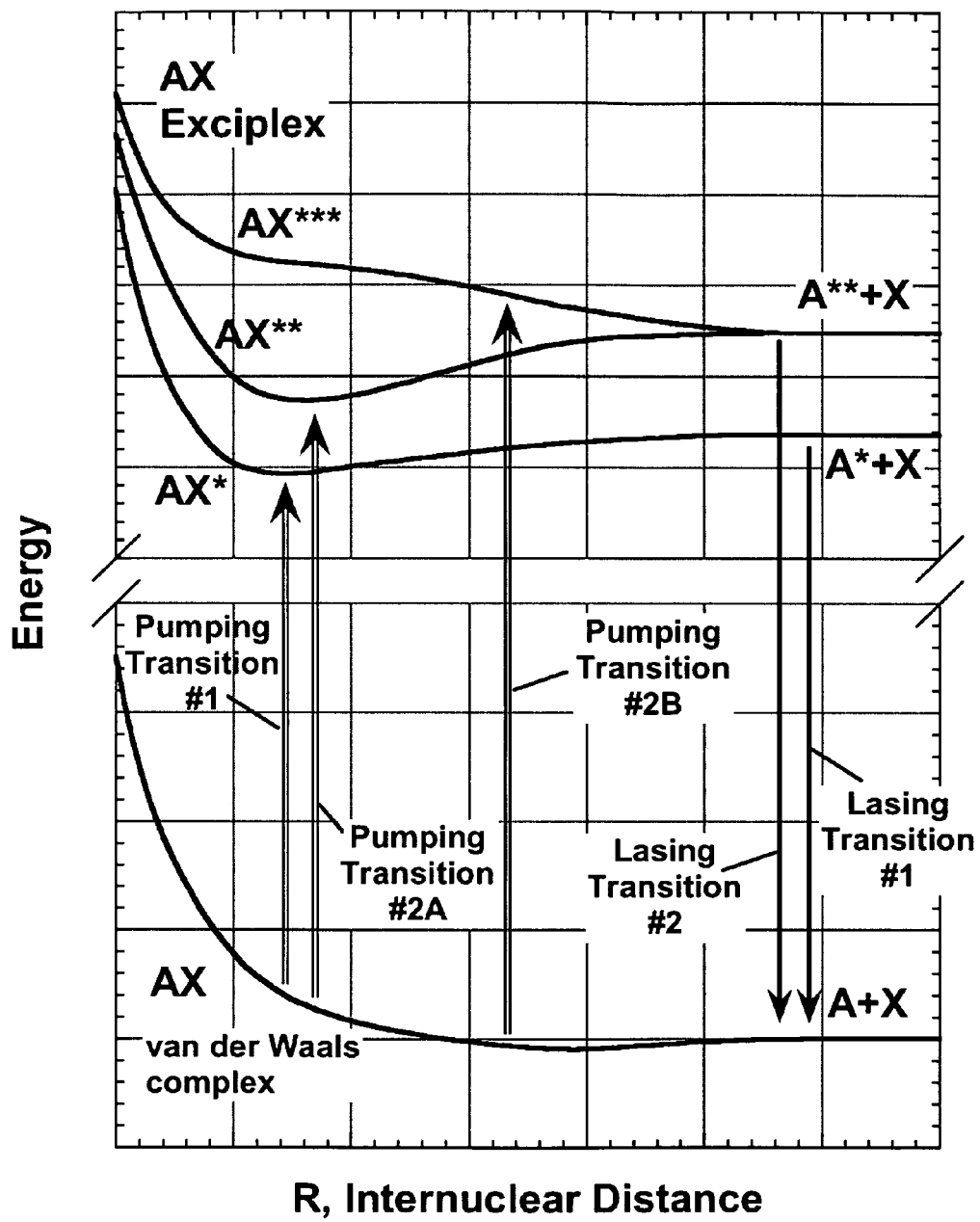
FIG. 5 is a partial energy level diagram for a generalized AX exciplex.

Referring now to FIG. 5. there is shown an energy level diagram for a generalized AX exciplex (where A is any alkali metal and X is a "perturber" such as a rare gas) and the correlated states of atom A are shown on the right side of FIG. 5.

As shown in FIG. 5, this diagram can also be generalized for the molecule AX, where A is an alkali atom (Li, Na, K, Rb, Cs, and Fr) and X is a "perturber" atom (or molecule) such as one of the rare gases (Ar, He, Ne, Kr, Xe, or Rn), mercury (Hg), or potentially a variety of possible polarizable molecules (e.g. ethane, methane, etc), The AX molecule generally represents an alkali metal that forms a van der Waals complex with a polarizable atom or molecule. The abscissa of FIG. 5 is labeled "R," which represents the internuclear separation between the A and X atoms. Such potentials were studied extensively in the 1970s (see Refs. 5-7, for example) as many research groups worldwide investigated these molecules as potential molecular lasers. It was found that, as molecular lasers, these systems are not attractive because the dissociation energies of the bound excited states are too small (~3-5 kT).

Figure 6:
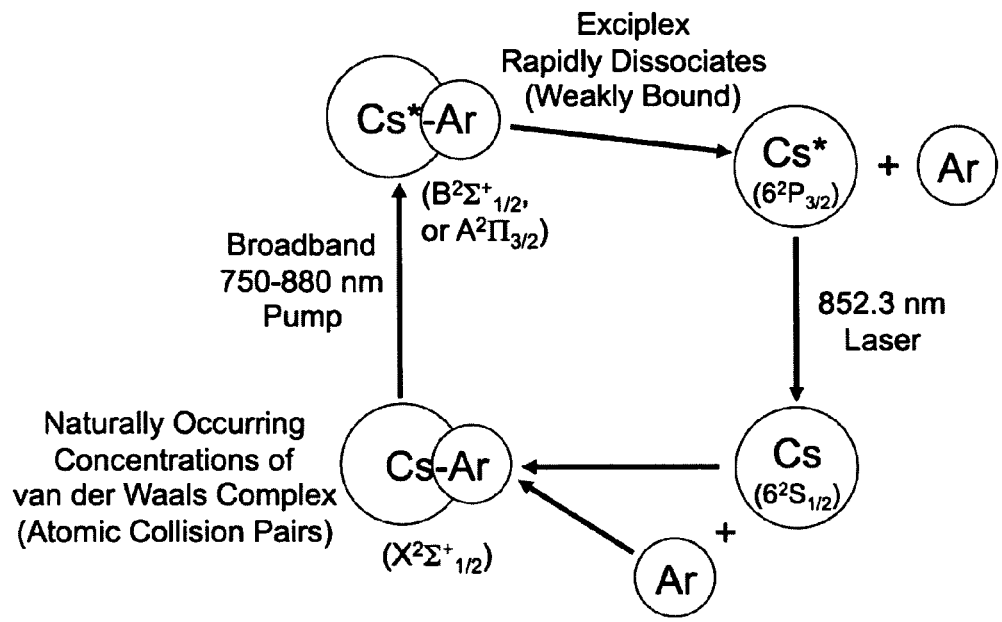
FIG. 6 is a pictorial representation of an embodiment resulting in lasing on the $Cs(6^2P_{3/2}) \rightarrow Cs(6^2S_{1/2})$ transition.

However, the embodiments provided herein take the opposite view and proposes using molecular absorption to pump and control an atomic laser. In FIG. 5, therefore, one can excite "pumping transition #2B" and populate a state, denoted AX*, of the AX molecule that is dissociative. Consequently, one is pumping on the "blue" side of the A→A resonance transition and yet populating the A state. One reason that this is advantageous over the current method of pumping at line center is that one can control the absorption strength. This is critical to scaling the volume of the laser and obtaining large output power. Furthermore, all of the "pumping transitions" in FIGS. 4 and 5 are so-called free→bound transitions of the molecule in which photoassociation takes place. Colliding pairs of Cs and Ar atoms (for example) are able to absorb a photon, yielding an excited molecule. Photoassociation is favored on either the "blue" or "red" side of the corresponding atomic transition, depending upon whether the molecular state in question is bound or dissociative. As an example, "pumping transition #2B" photoexcites Cs—Ar ground state atomic pairs to the $B^2\Sigma_{1/2}^+$ state of the CsAr exciplex. Notice that CsAr ($B^2\Sigma_{1/2}^+$) is correlated with $Cs(6p\ ^2P_{3/2})$+Ar in the separated atom limit but, because the $B^2\Sigma_{1/2}^+$ state is dissociative, the process $Cs+Ar+\hbar\omega \rightarrow CsAr(B)$ occurs to the blue side of the Cs 6s $^2S_{1/2} \rightarrow 6\ ^2P_{3/2}$ transition. In fact, measurements show this absorption, known as a blue satellite, to peak at ~835 nm for CsAr. A second advantage of this scheme is that photoassociation spectra are broad (in comparison with narrow atomic lines), thereby allowing the full spectral width of conventional, high power laser diodes to be accommodated. Furthermore, the diodes need not be "tuned" or wavelength stabilized by auxiliary electronics. A pictorial representation of this scheme specialized to the CsAr exciplex is illustrated in FIG. 6, where the $CsAr(B^2\Sigma_{1/2}^+)$ state corresponds to the AX* state, the $Cs(6^2P_{3/2})$ state corresponds to the A state, and the $Cs(6^2S_{1/2})$ state corresponds to the A state, discussed above, resulting in lasing on the A→A transition or $Cs(6^2P_{3/2}) \rightarrow Cs(6^2S_{1/2})$ transition at 852.3 nm (in vacuum, 852.1 nm in air).

One also has the option of "pumping transition #2A" in FIG. 5. Because vibrational states near the dissociation limit of AX are being populated, these states are weakly-bound and will dissociate quickly, yielding atoms in the A state. This results in lasing on transition #2 (equivalent to the aforementioned $D_2$ transition of an alkali). The pictorial representation of this scheme specialized to the CsAr exciplex is also illustrated in FIG. 6, where the $CsAr(A^2\Pi_{3/2})$ state corresponds to the AX state, the $Cs(6^2P_{3/2})$ state corresponds to the A state, and the $Cs(6^2S_{1/2})$ state corresponds to the A state, discussed above.

Figure 7:
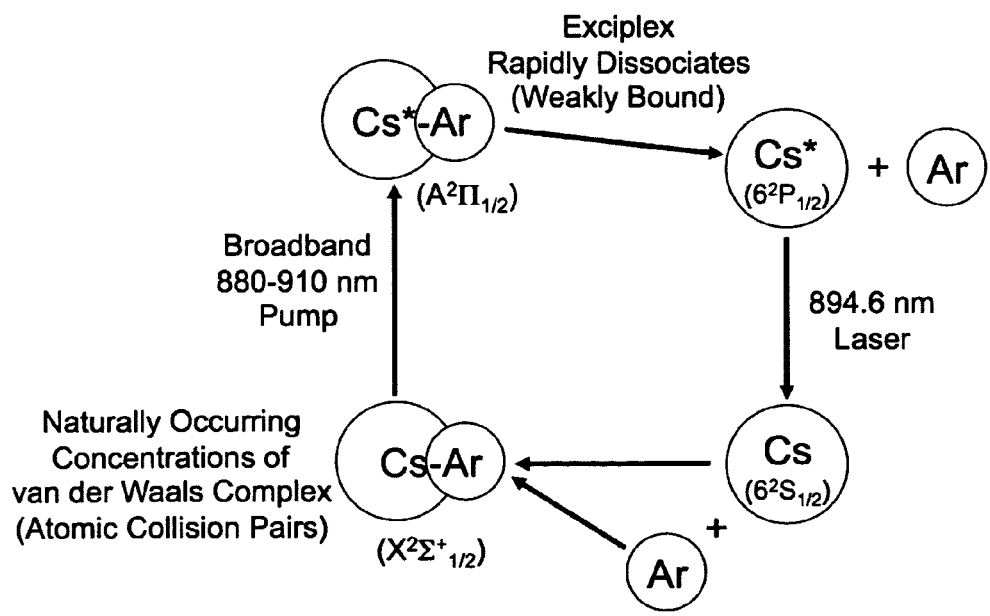
FIG. 7 is a pictorial representation of an embodiment resulting in lasing on the $Cs(6^2P_{1/2}) \rightarrow Cs(6^2S_{1/2})$ transition.

Additionally, "pump transition #1" can excite the weakly-bound AX* state resulting in high densities of A* atoms by pumping on the "red" (long wavelength) side of the A→A* resonance transition. This results in lasing on transition #1 (equivalent to the aforementioned $D_1$ transition of an alkali). A pictorial representation of this scheme specialized to the CsAr exciplex is illustrated in FIG. 7, where the $CsAr(A^2\Pi_{1/2})$ state corresponds to the AX* state, the $Cs(6^2P_{1/2})$ state corresponds to the A* state, and the $Cs(6^2S_{1/2})$ state corresponds to the A state, discussed above, resulting in lasing from the AX*→A transition, or $Cs(6^2P_{1/2}) \rightarrow Cs(6^2S_{1/2})$ transition at 894.6 nm (in vacuum, 894.3 nm in air).

Figure 8:
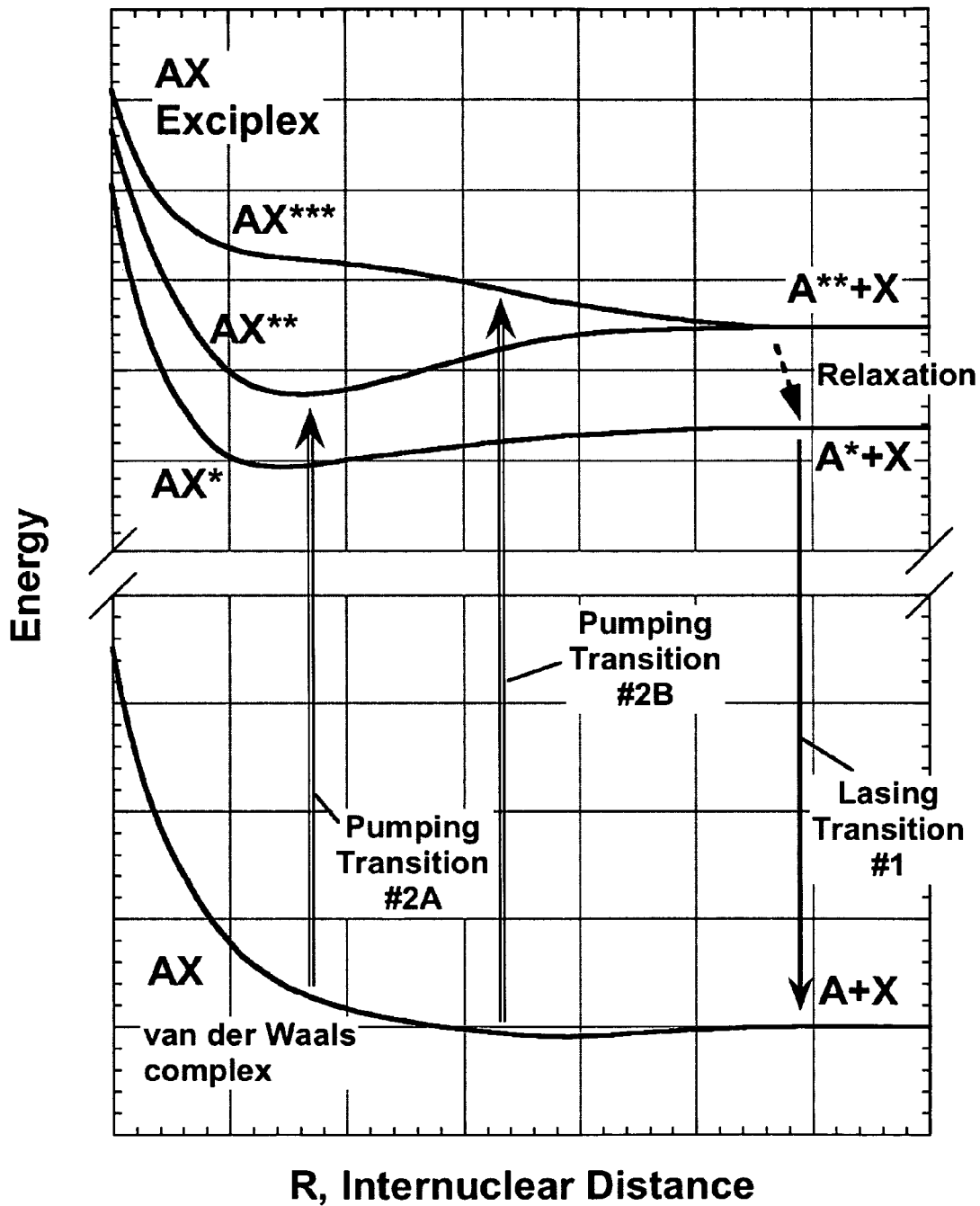
FIG. 8 is a partial energy level diagram for a generalized AX exciplex using relaxation of the A** state to the A* state.
Figure 9:
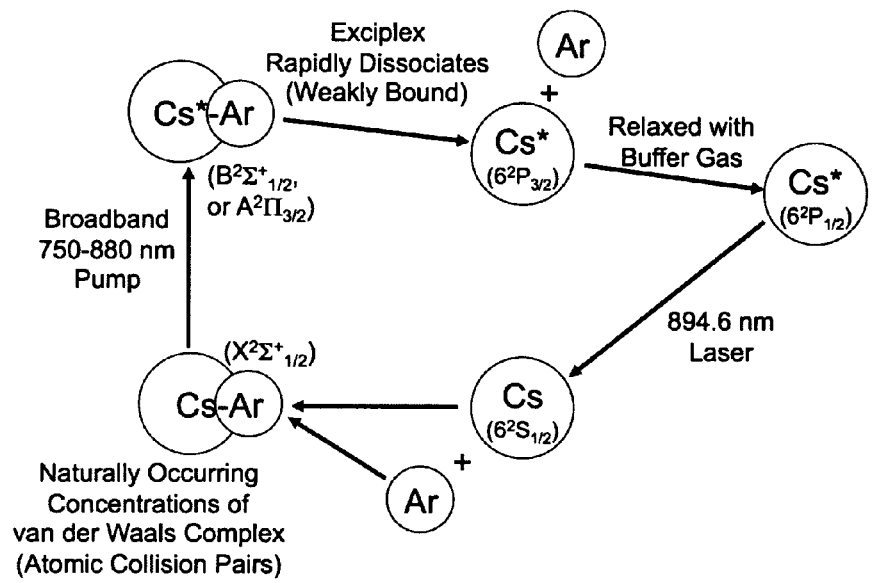
FIG. 9 is a pictorial representation of an embodiment of FIG. 8 resulting in lasing on the $Cs(6^2P_{1/2}) \rightarrow Cs(6^2S_{1/2})$ transition.

Another embodiment of this invention is illustrated in FIG. 8. In this embodiment, pumping transitions #2B or #2A populate the AX* or AX states, respectively, resulting in the production of atoms in the A state of the alkali metal. This is followed by kinetic relaxation of the A state to the A* state via collisions with other gases, possibly the "perturber" gas X or some other gas additive. This results in lasing on transition #1, A*→A transition, (equivalent to the aforementioned $D_1$ transition of an alkali). While this embodiment utilizes the kinetic relaxation process discussed by Krupke et al. [1-4], this embodiment is uniquely different (is not anticipated by the Krupke[1]) because it utilizes the broadband absorption naturally available through the use of the exciplex AX for pumping more efficiently than that available with the scheme of Krupke et al. [1-4] A pictorial representation of this scheme specialized to the CsAr exciplex is illustrated in FIG. 9, where the $CsAr(B^2\Sigma_{1/2}^+)$ state corresponds to the AX* state, the $CsAr(A^2\Pi_{3/2})$ state corresponds to the AX state, the $Cs(6^2P_{3/2})$ state corresponds to the A** state, the $Cs(6^2P_{1/2})$ state corresponds to the A* state, and the $Cs(6^2S_{1/2})$ state corresponds to the A state, discussed above in FIG. 8.

As mentioned above, the Krupke scheme of both axial pumping and lasing has significant disadvantages for scaling atomic lasers to high energy levels. In one or more embodiments presented herein the recommendation is for the pumping of the laser medium in a direction transverse to the lasing axis for high power systems having output power greater than 1 kW. It is noted that axial pumping could still be used in practical low power output devices of less than 1 kW.

Figure 10:
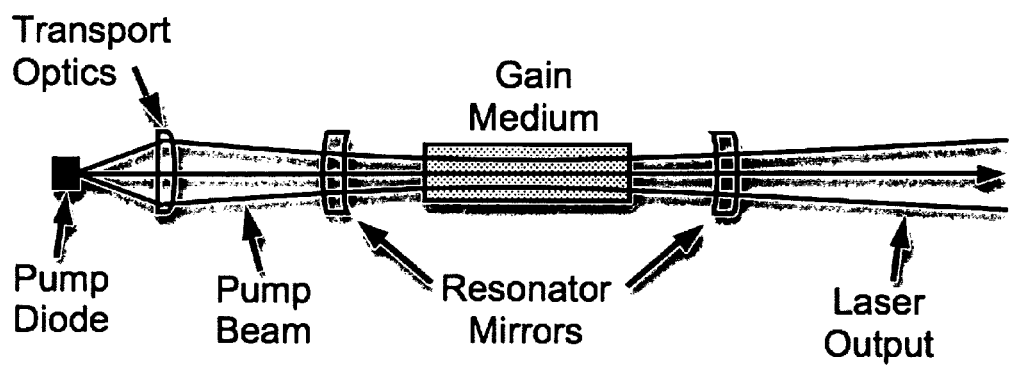
FIG. 10 is a schematic illustration of an axially pumped-laser.

FIG. 10 illustrates a classic axial pumping (also called end pumping) and lasing scheme that has been used previously by others for Cs and other alkali atomic lasers, and can be used for one or more embodiments of the present invention. As illustrated in FIG. 10, a classic axially (longitudinally) pumped-laser is shown having a pump diode pumping the pump source through coupling-focusing optics, then through a dichroic optic that transmits the pump wavelength, but reflects radiation at the desired laser wavelength, emanating from the pumped active gain medium. A second mirror forms an optical resonator for laser output from the active gain medium. A difficulty with such end pumped lasers is that it is difficult (expensive and sometimes impossible) to obtain dichroic optics that have sharp transitions from low reflectivity for the pump wavelength and high reflectivity for the desired laser transition; this is especially true for alkalis such as lithium and sodium that have relatively closely spaced $D_1$ and $D_2$ transitions.

Figure 11:
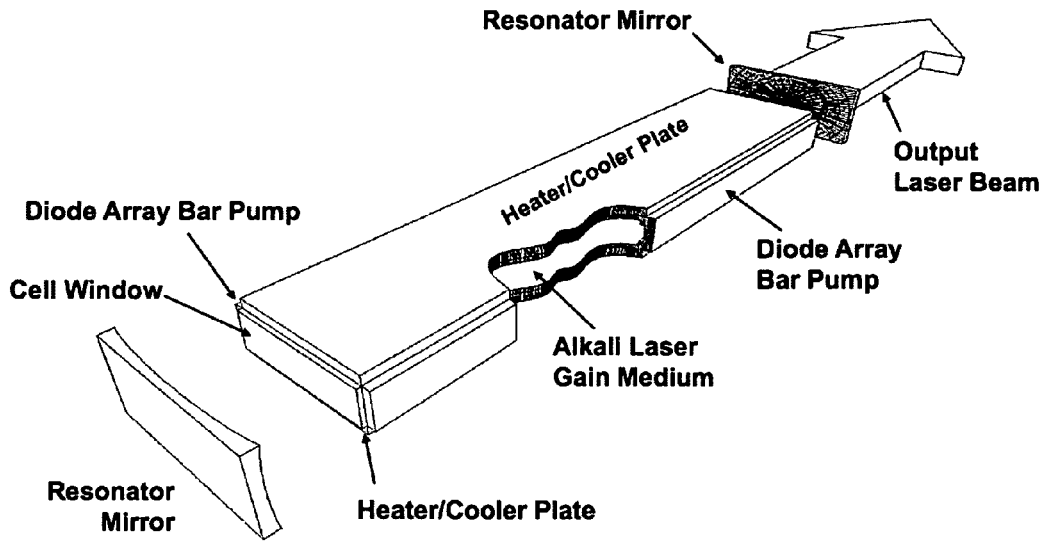
FIG. 11 is a schematic illustration of a tranversely pumped-longitudinally lased alkali laser.

Referring now to FIG. 11 there is shown a schematic diagram of a transversely pumped alkali laser. Diodes are used as the pump source and can be located on opposite sides of the gain medium for more uniform pumping. Heating elements (such as thermoelectric heaters) are used to maintain the active medium alkali gas cell at a uniform temperature; the heating elements can be situated on opposite sides of the gain medium for more uniform thermal management. Coatings reflective at the pump wavelength can be placed between the gas cell wall and the heating elements, or on the inside of the cell wall, to minimize pump beam losses. Transmissive anti-reflective windows are placed on both ends of the gas cell to seal the system. These windows could also have dielectric coatings that are reflective at the pump wavelength, again to minimize any pump beam losses. Reflective (or partially reflective) mirrors for the desired laser wavelength may be placed outside of the alkali gas cell to form a resonator with an optical axis parallel to the axis of the gas cell. Either a stable resonator or an unstable resonator can be implemented. Unstable resonators would be used for applications requiring high power and high beam quality. For very high power systems, it may be necessary to employ folded resonator designs using multiple cell sections with turning mirrors between individual alkali gas cell sections to minimize amplified spontaneous emission (ASE). The number of cells in a high power folded resonator system could range from 2-100, depending upon the magnitude of the ASE problem. Most likely, the number of stages required would be between 5 and 20.

Further, for high power systems of greater than 1 kW, it is likely that there may be a need to provide flow circulation to (i) enable more efficient cooling of the gas medium, and (ii) aid in more uniformly distributing the gain medium to minimize optical phase distortions. Such a scheme would optimize thermal management and optical beam quality of a high power system. In addition while, a rectangular cross-section of the gain medium is illustrated, other geometries are possible. A cutaway section further shows the alkali laser gain medium inside of the gas cell.

Figure 12:
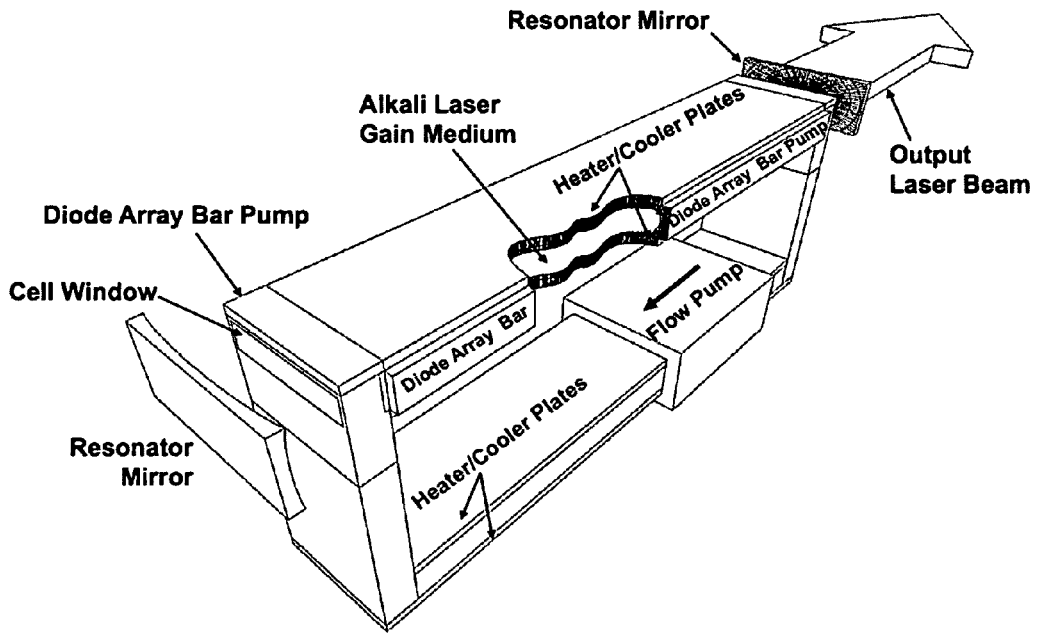
FIG. 12 is a schematic of a flowing loop, tranversely pumped-longitudinally lased alkali laser.

In another embodiment of the present invention, FIG. 12 shows a schematic of a flowing loop concept for this diode pumped exciplex assisted alkali laser. The elements of this system are similar to those detailed for FIG. 11, but include a flow pump to circulate the gases and additional heater/cooler plates for improved thermal management. As shown, a second cavity is utilized with the axial flow pump to circulate the gases within the second cavity and the optical cavity.

The commercial implications of this technology is believed to be significant. Lasing at 895 nm and 795 nm has already been achieved with the prior art approach and has yielded up to ~13 W. It is expected that the present embodiments will obtain considerably higher values with the method described above. For cesium (Cs), for example, it is expected that hundreds of watts on both the 894.6 nm and 852.3 nm transitions will be obtained, and with further scaling efforts potentially hundreds of kilowatts may be obtained. Frequency doubling such lasers will yield at least tens of watts in the blue and deep violet (447.3 and 426 nm) and even into the near-ultraviolet (near-UV) from frequency-doubled rubidium (397.5 and 390 nm), doubled potassium (385 and 383 nm), doubled sodium (294.9 and 294.1 nm), and doubled lithium (335.5 nm) atomic lasers are not currently available and would be of considerable commercial value. These frequency doubled systems can be taken to higher power levels as the fundamental frequency versions are scaled in power. A significant advantage to the lasers in the near-UV is that they are considered to have wavelengths that are eye-safe compared to lasers having wavelengths in the 400-1400 nm range because the lens/cornea of the human eye does not readily transmit wavelengths<400 nm and >1400 nm.

In summary, one or more of the embodiments presented herein offer major advantages over the prior art of pumping alkali atomic lasers with semiconductor lasers. One or more of the embodiments presented herein:

Optically pumps alkali atom-rare gas atomic pairs at wavelengths on the short or long wavelength side (Blue Wing or Red Wing) of the alkali transitions, which is outside of the normal Lorentzian spectral wing. Prior work involved pumping at line center and absorption by the Lorentzian spectral lineshape. Much of the prior work has also involved pumping with linewidth-narrowed lasers, but such an approach (i.e., prior art) is expensive and requires electronic control to maintain ("lock") the laser diode wavelength to a precise value and thereby the prior art has inherently lower electrical efficiency than does this invention.

Allow one to drive an atomic laser with readily available, high power semiconductor lasers with emission linewidths of several nm.

Lasing on either the A**→ground or A*→ground atomic transitions can be obtained through choice of the appropriate pumping wavelength range. In the prior art, lasing on only the A*→ground transition can be achieved.

In addition, lasing on either the A** or A*→ground is accomplished without the need to collisionally relax the A** state to the A* state. This, too, is a significant advantage over the prior art.

Because the exact form of the A-X interaction potentials changes with the identity of X, considerable flexibility exists in tailoring the absorption spectrum of the A-X system to efficient and inexpensive laser diodes. The earlier discussion emphasized the dissociation of alkali-rare gas molecules but a wide variety of other molecules are available. One example is the magnesium (Mg)-rare gas excimers. Furthermore, one or more embodiments are applicable to collision-induced absorption production of the atomic upper laser level. Collision-induced absorption in Cs—Xe mixtures, for example, occurs both in the yellow and red, producing Σ or Π states of the CsXe molecule. These molecules quickly dissociate or radiate to the lower-lying $A^2\Pi$ states. These, in turn, dissociate to yield Cs $^2P_J$ atoms as described previously. Therefore, pumping collision-induced satellites will also produce atomic lasers in the alkalis.

Frequency doubling of these devices would result in more efficient, high power, continuous wave lasers in the blue, deep violet, and near-UV than are presently available. A significant advantage to the lasers in the near-UV is that they are considered to have wavelengths that are eye-safe compared to lasers having wavelengths in the 400-1400 nm range.

Transverse pumping of the active gain medium is preferred for scaling of this concept to high power levels of greater than 1 kW. Conceptual schematics are included for transverse diode pumped exciplex-assisted alkali lasers with and without gas flow circulation to optimize thermal management and optical beam quality.

Figure 13:
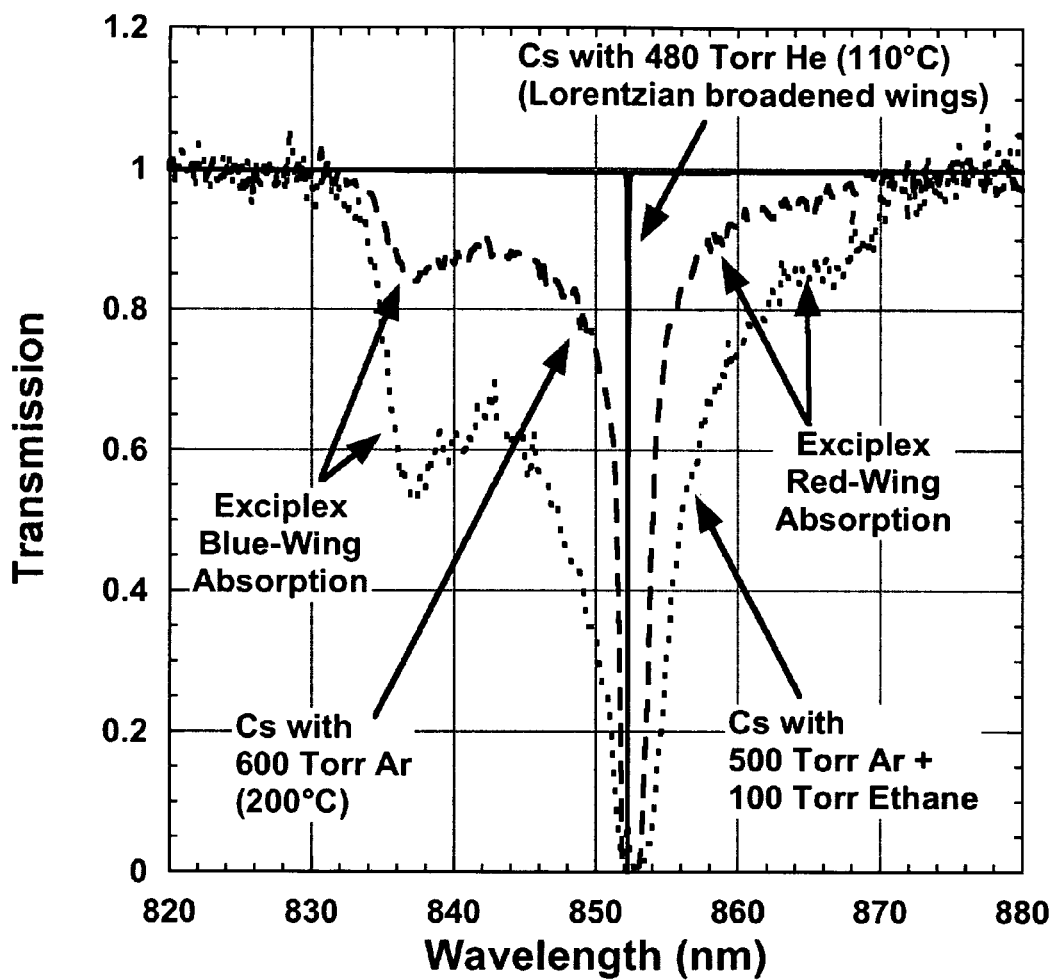
FIG. 13 are transmission curves through an alkali containing gas cells for Cs-rare gas mixtures enhanced by the addition of ethane to the rare gas-Cs vapor mixture.

Finally, it should be mentioned that experiments have shown the Cs-rare gas blue satellite to be intensified by the addition of ethane to the rare gas-Cs vapor mixture, FIG. 13; it is likely that this phenomenon occurs with other alkalis and other polarizable molecules. This is a result of ethane molecules forming a complex with Cs or with Cs and a rare gas atom. Such complex exciplexes offer further versatility to this invention by allowing one to determine the strength of the photoassociation cross-section. In addition to alkali-rare gas-ethane mixtures, hydrocarbons other than ethane or fluorinated hydrocarbons (such as Freons) may be used.

As shown in FIG. 13, a transmission trace of Cs—He (480 Torr) with Lorentzian line broadening at 110° C. is dramatically narrower than transmission traces for Cs—Ar (500 Torr)-Ethane (100 Torr) and Cs—Ar (600 Torr) mixtures with exciplex blue and red-wing broadening taken at 200° C. The broadband exciplex absorption is clearly evident and the presence of ethane is enhancing the exciplex absorption (possibly through either a Cs-Ethane exciplex or a Cs—Ar-Ethane exciplex).

From the foregoing and as mentioned above, it will be observed that numerous variations and modifications may be effected without departing from the spirit and scope of the novel concept of the invention. It is to be understood that no limitation with respect to the specific methods and apparatus illustrated herein is intended or should be inferred.

REFERENCES

1. W. F. Krupke, U.S. Pat. No. 6,643,311 B2 (2003).
2. W. F. Krupke, R. J. Beach, C. K. Kanz, and S. A. Payne, Resonance Transition 795-nm Rubidium Laser, *Opt. Lett.* 28, 2336 (2003).
3. W. F. Krupke, R. J. Beach, C. K. Kanz, and S. A. Payne, DPAL: A New Class of CW, Near-Infrared, High-Power Diode-Pumped Alkali (Vapor) Lasers, *Proc. SPIE* 5334, 156 (2004).
4. R. J. Beach, W. F. Krupke, V. K. Kanz, S. A. Payne, M. A Dubinskii, and L. D. Merkle, J., End-Pumped Continuous-Wave Alkali Vapor Lasers: Experiment, Model, and Power Scaling, *Opt. Soc. Am. B,* 21, 2151 (2004).
5. R. E. M. Hedges, D. L. Drummond, and A. Gallagher, Extreme-Wing Line Broadening and Cs-Inert-Gas Potentials, *Phys. Rev. A* 6, 1519 (1972).
6. C. L. Chen and A. V. Phelps, Absorption Coefficients for the Wings of the First Two Resonance Doublets of Cesium Broadened by Argon, *Phys. Rev. A* 7, 470 (1973).
7. J. Pascale and J. Vandeplanque, Excited Molecular Terms of the Alkali-Rare Gas Atom Pairs, *J. Chem. Phys.* 60, 2278 (1974).

We claim:
1. An alkali laser comprising:
an optical cavity;
van der Waals complexes within said optical cavity, each van der Waals complex formed from an alkali atom joined with a polarizable atom or molecule; and a pump laser for optically pumping said van der Waals complexes in a spectral satellite wherein the van der Waals complex is excited to form a excited molecule that subsequently dissociates, producing an excited alkali atom, thereby resulting in the generation of a laser emission on a transition of the excited alkali atom that terminates to a ground state, and wherein a wavelength of the pump laser optically pumps said van der Waals complex to either:

(a) an $A^2\Pi_{3/2}$ or $B^2\Sigma^+_{1/2}$ state, both $A^2\Pi_{3/2}$ and $B^2\Sigma^+_{1/2}$ states dissociate to form the excited alkali atom in a $^2P_{3/2}$ state and wherein the lasing transition is known as a $D_2$ transition and returns the excited alkali atom to the ground state of $^2S_{1/2}$, or (b) an $A^2\Pi_{1/2}$, state which dissociates to form the excited alkali atom in a $^2P_{1/2}$ state and wherein the lasing transition is known as a $D_1$ transition and returns the excited alkali atom, to the ground state $^2S_{1/2}$.

2. The laser of claim 1, wherein the optical cavity further includes a buffer gas to relax the excited alkali atom from the $^2P_{3/2}$ state to a $^2P_{1/2}$ state and wherein the lasing transition is known as a $D_1$ transition and returns the excited alkali atom from the $^2P_{1/2}$ state to the ground state $^2S_{1/2}$.

3. The laser of claim 1, wherein the polarizable atom or molecule is a rare gas atom, such as, but not limited to, one of the following gases, Ne, Ar, Kr, Xe, or Rn.

4. The laser of claim 1, wherein the polarizable atom or molecule is a molecular gas, such as methane.

5. The laser of claim 1, wherein the polarizable atom or molecule is a combination of a rare gas and a polarizable molecular gas.

6. An alkali laser comprising:

an optical cavity resonant at a wavelength to define a lasing transition;

a van der Waals complex within said optical cavity, said van der Waals complex formed from an alkali vapor joined with a polarizable gas; and a pump laser for optically pumping said van der Waals complex outside of the Lorentzian spectral wings having a full width half maximum (FWHM) of no greater than 6 nm that are centered on the $D_2$ alkali transition, wherein the van der Waals complex is excited to form an exciplex that dissociates forming an excited alkali vapor and for generating a laser emission output at the wavelength of the lasing transition and wherein a wavelength of the pump laser optically pumps said van der Waals complex to:

(a) either an $A^2\Pi_{3/2}$ or $B^2\Sigma^+_{1/2}$ state, both $A^2\Pi_{3/2}$ and $B^2\Sigma^+_{1/2}$ states dissociate to form the excited alkali vapor in a $^2P_{3/2}$ state and wherein the lasing transition is known as a $D_2$ transition and returns the excited alkali vapor to the ground state of $^2S_{1/2}$, or (b) an $A^2\Pi_{1/2}$ state which dissociates to form the excited alkali vapor in a $^2P_{1/2}$ state and wherein the lasing transition is known as a $D_1$ transition and returns the excited alkali vapor to the ground state $^2S_{1/2}$.

7. The laser of claim 6, wherein the polarizable gas is a rare gas, such as, but not limited to, one of the following gases, Ne, Ar, Kr, Xe, or Rn.

8. The laser of claim 6, wherein the polarizable gas is a combination of a rare gas and a polarizable molecular gas.

9. The laser of claim 6, wherein the optical cavity further includes a buffer gas to relax the excited alkali vapor from the $^2P_{3/2}$ state to a $^2P_{1/2}$ state and wherein the lasing transition is known as a $D_1$ transition and returns the excited alkali vapor from the $^2P_{1/2}$ state to the ground state $^2S_{1/2}$.

10. The laser of claim 9, wherein the buffer gas is a combination of a rare gas and a molecular gas, and the buffer gas is either the same as or different than the polarizable gas used for the van der Waals complex.

11. A method for lasing comprising:

pumping, with a pump laser, a van der Waals complex, outside of the Lorentzian spectral wings having a full width half maximum (FWHM) of no greater than 6 nm that are centered on the $D_2$ alkali transition, wherein the van der Waals complex is formed from an alkali vapor joined with a polarizable gas such that during pumping of the van der Waals complex, the van der Waals complex excites to form an exciplex that dissociates forming an excited alkali vapor, and generating laser emission output with an optical resonator at a wavelength defined by an atomic transition and wherein the step of pumping is done at a wavelength to pump the van der Waals complex to:

(a) either an $A^2\Pi_{3/2}$ or $B^2\Sigma^+_{1/2}$ state, both $A^2\Pi_{3/2}$ and $B^2\Sigma^+_{1/2}$ states dissociate to form the excited alkali vapor in a $^2P_{3/2}$ state wherein the lasing transition is known as a $D_2$ transition and returns the excited alkali vapor to the ground state of $^2S_{1/2}$, or (b) an $A^2\Pi_{1/2}$ state which dissociates to form the excited alkali vapor in the $^2P_{1/2}$ state and wherein the lasing transition is known as a $D_1$ transition and returns the excited alkali vapor to the ground state $^2S_{1/2}$.

12. The method of claim 11, wherein the optical cavity further includes a buffer gas to relax the excited alkali vapor from the $^2P_{3/2}$ state to the $^2P_{1/2}$ state and wherein the lasing transition is known as a $D_1$ transition and returns the excited alkali vapor from the $^2P_{1/2}$ state to the ground state $^2S_{1/2}$.

\* \* \* \* \*